(12) United States Patent
Yang et al.

(10) Patent No.: US 8,584,240 B1
(45) Date of Patent: Nov. 12, 2013

(54) COMMUNITY SCAN FOR WEB THREAT PROTECTION

(75) Inventors: Jin-Ning Yang, Taipei (TW); Chang Wei-Ching, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1506 days.

(21) Appl. No.: 11/866,918

(22) Filed: Oct. 3, 2007

(51) Int. Cl.
 *H04L 29/06* (2006.01)
(52) U.S. Cl.
 USPC .............. 726/24; 713/188; 726/22; 726/23
(58) Field of Classification Search
 USPC ...................................... 713/188; 726/26, 24
 See application file for complete search history.

(56) References Cited

U.S. PATENT DOCUMENTS

| | | | | |
|---|---|---|---|---|
| 7,287,279 B2 * | 10/2007 | Bertman et al. | ................. | 726/23 |
| 7,634,810 B2 * | 12/2009 | Goodman et al. | ............. | 726/22 |
| 7,802,298 B1 * | 9/2010 | Hong et al. | ...................... | 726/22 |
| 8,332,947 B1 * | 12/2012 | Bregman et al. | ................ | 726/25 |
| 2003/0097591 A1 * | 5/2003 | Pham et al. | .................... | 713/201 |
| 2006/0075504 A1 * | 4/2006 | Liu | ................................ | 726/25 |
| 2006/0095955 A1 * | 5/2006 | Vong | ................................ | 726/3 |
| 2007/0006305 A1 * | 1/2007 | Florencio et al. | ............... | 726/22 |
| 2008/0109871 A1 * | 5/2008 | Jacobs | ............................. | 726/1 |
| 2008/0154678 A1 * | 6/2008 | Botelho | ........................... | 705/7 |
| 2010/0071063 A1 * | 3/2010 | Wang et al. | ..................... | 726/23 |

\* cited by examiner

*Primary Examiner* — Mohammad L Rahman
(74) *Attorney, Agent, or Firm* — IPSG, P.C. Intellectual Property Law

(57) ABSTRACT

An apparatus for updating a rating database arrangement including a first gateway and a first anti-virus detection arrangement configured to be activated by the first gateway when the first gateway intercepts a Uniform Resource Locator (URL) request. The first anti-virus detection arrangement is configured to include at least an anti-virus engine, the anti-virus engine configured at least for scanning a URL attributable to the URL request. The anti-virus engine is also configured for generating a scanning result for the URL attributable to the URL request, the scanning result configured to include one of a safe scanning result and an other than safe scanning result. The first anti-virus detection arrangement further includes a feedback module, the feedback module configured at least for extracting the other than safe scanning result from the anti-virus engine and sending the other than safe scanning result to the rating database arrangement.

20 Claims, 2 Drawing Sheets

COMMUNITY SCAN FOR WEB THREAT PROTECTION

BACKGROUND OF THE INVENTION

The Internet has become ubiquitous as million of users have employed the Internet as a medium of choice for communicating and for sharing information. Due to the success of the Internet, the Internet has also become a medium by which malicious code may be spread to the computer systems of unsuspecting users of the Internet. Once the malicious code has successfully infiltrated a computer system, the malicious code can cause far-reaching damage (e.g., deleting files, rewriting the registry, rewriting the disk space, corrupting hard drives, displaying unsolicited messages, etc.) that may not be limited to one individual computer system but may also spread to other computers that may be on the same network.

A popular method by which malicious code may be spread is by embedding the code onto a web page as a payload. As discussed herein, a payload refers to an executable file that may be downloaded from a website onto a user's computer system. To prevent the spread of malicious payloads, an anti-virus engine may be installed at the gateway host and/or at the individual computer to scan each payload before allowing the payload to be downloaded onto a user's computer system. Once the payload has been scanned, the anti-virus engine may allow the payload to be downloaded if the payload includes no known malicious code. However, if the anti-virus engine detects malicious code, then the anti-virus engine may send a warning message to the user's computer alerting the user of possible malicious code.

The task of scanning each payload is a seemingly endless task since a typical anti-virus engine may perform the scanning function each time the payload is encountered. Thus, the anti-virus engine may have to rescan the same payload each time the payload is encountered by the anti-virus engine. Accordingly, the anti-virus engine may consume a relatively high amount of processing power and bandwidth in order to perform its scanning function.

To reduce the scanning bandwidth requirement, some anti-virus engines may consult with a rating database before performing the scanning function. As discussed herein, a rating database refers to a database that stores data about malicious codes. Traditionally, a rating database may acquire its data by extracting information from external sources, such as from white lists, black lists, rating services, other rating databases, and the like.

For anti-virus engines that makes use of a rating database, the anti-virus engine may query the rating database to determine if the payload is tracked by the rating database as a malicious payload. If the payload is determined to be malicious from the rating database, the anti-virus engine may send a warning message to the user's computer alerting the user of the malicious nature of the payload. However, if the payload is not tracked by the rating database, then the anti-virus engine may scan the payload as aforementioned.

As can be appreciated from the foregoing, the rating database may be limited to the information that may be acquired from external sources. In an example, a user encounters a payload with malicious code; however, the user does not report his experience. Generally, most users may not take the additional time required to report their experience. Thus, the external sources provide, at best, an incomplete list of malicious code. Since only a percentage of existing malicious payloads are tracked in the rating database, the anti-virus engine ends up scanning many payloads that are not tracked in the rating database.

In addition, before a payload may be added to a rating database, each payload may have to be verified. In other word, a candidate payload to be tracked by the rating database may have to be processed by scanning to verify that the payload indeed includes malicious code before the payload can be properly tracked by the rating database. As a result, a relatively large amount processing power and bandwidth may have to be consumed using the prior art approach.

SUMMARY OF INVENTION

The invention relates, in an embodiment, to an apparatus for updating a rating database arrangement. The apparatus includes a first gateway and a first anti-virus detection arrangement configured to be activated by the first gateway when the first gateway intercepts a Uniform Resource Locator (URL) request. The first anti-virus detection arrangement is configured to include at least an anti-virus engine, the anti-virus engine configured at least for scanning a URL attributable to the URL request. The anti-virus engine is also configured for generating a scanning result for the URL attributable to the URL request, the scanning result configured to include one of a safe scanning result and an other than safe scanning result. The first anti-virus detection arrangement further includes a feedback module, the feedback module configured at least for extracting the other than safe scanning result from the anti-virus engine and sending the other than safe scanning result to the rating database arrangement.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
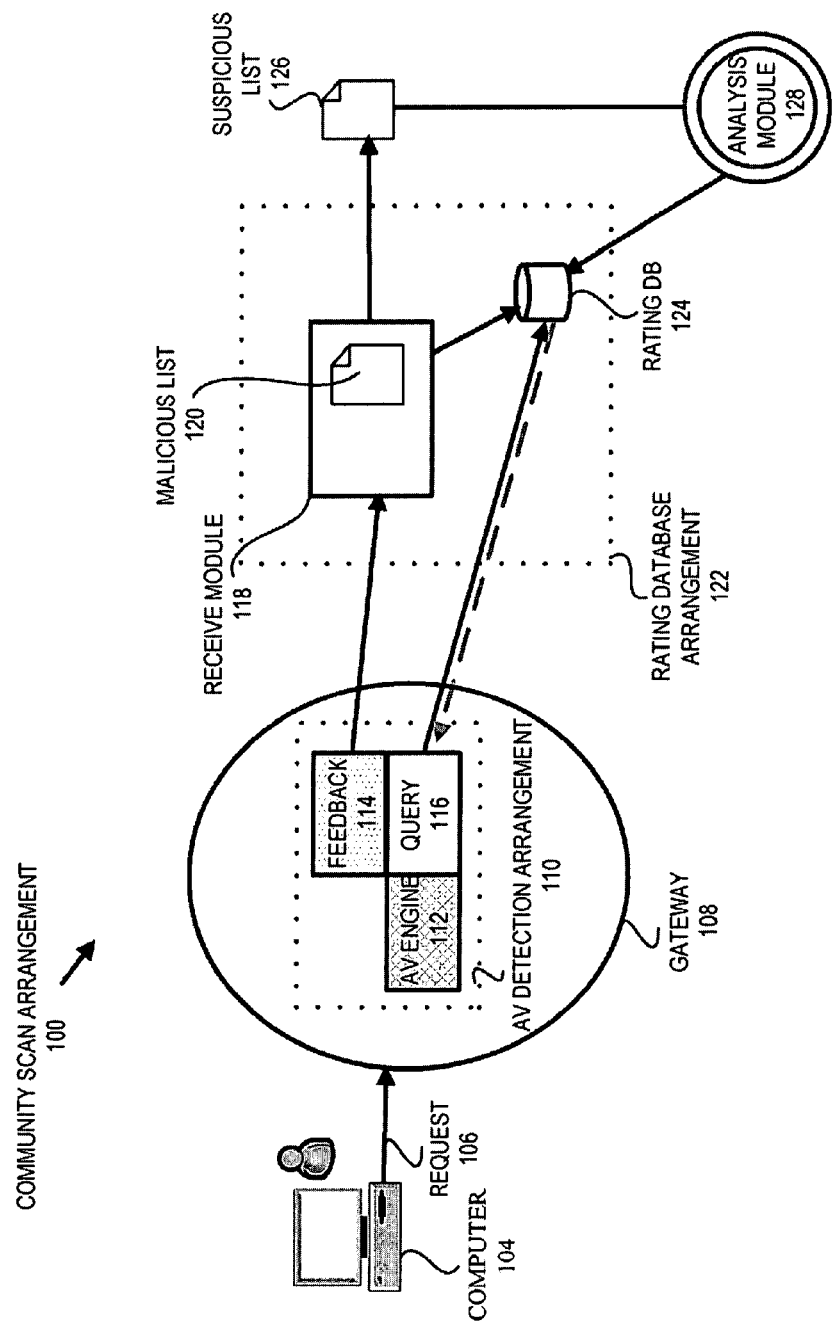
FIG. 1 shows, in accordance with an embodiment of the present invention, a community scan arrangement.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As discussed earlier, to prevent the spread of malicious payloads, an anti-virus engine may be installed at the gateway host and/or at the user's computer to scan each payload for malicious code. During the scanning process, the anti-virus engine may generate scanning results pertaining to each payload. Traditionally, the scanning results generated by an anti-virus engine may be evaluated in order to either allow the payload to be downloaded onto the user's computer system or send a warning message to alert the user of possible malicious codes.

As aforementioned, thousands, or even millions, of URLs may be accessed daily by the mass of interne users, some of which may include payloads that may require scanning. However, the scanning results were mostly utilized by gateways to ascertain whether access should be granted. Generally, the scanning results were discarded after the decision has been made regarding access. In some circumstances, the URLs that may have been recently visited by a user's computer may be stored within a local cache on the user's system and/or the gateway, thereby enabling the URL to be accessed quickly when the user wants to revisit the same site. However, if the URL includes a payload, the payload may still be required to be rescanned. In addition, since the scanning result may be temporarily stored (e.g., cached), the scanning result may not be available after a certain time period has expired or after the system has been refreshed or restarted.

In one aspect of the invention, the inventor herein realized that, instead of discarding the scanning results after determining users' access to URLs, the scanning results for the payloads for various users may be utilized to update a rating server database. Accordingly, the gateway may take advantage of payload scanning data that has already been verified by numerous individual gateways. As the term is employed herein, the gateway represents a logic function block and may be implemented by any suitable means, including software and/or hardware on the user's computer or on a server, or on a proxy server, or on a firewall, etc.

By updating the rating server database with already existing payload scanning data from multiple gateways associated with multiple users, a larger collection of known malicious payloads may be available for sharing among many users. Accordingly, fewer payloads need to be rescanned by individual gateways since more payload scanning data is now available in the rating database. Therefore, a gateway may provide a better user's experience since the bandwidth and/or processing power that may have been required in the past to perform rescanning may now be available.

In accordance with embodiments of the invention, a community scan arrangement is provided for efficiently and automatically performing malicious code detection. Embodiments of the invention include utilizing an anti-virus detection arrangement comprising of an anti-virus engine and at least one of a feedback module and a query module.

In this document, various implementations may be discussed using payloads as examples. This invention, however, is not limited to payloads and may include any malicious code utilized to cause harm and/or damage to a user's computer system. Instead, the discussions are meant as examples and the invention is not limited by the examples presented.

In one or more embodiments of the invention, a community scan arrangement provides an anti-virus detection arrangement and a rating database arrangement. In an embodiment, the anti-virus detection arrangement may include an anti-virus engine, a feedback module, and a query module. The anti-virus engine may be configured to scan URLs with potential malicious code (e.g., URLs with payloads). Although the scanning is referred to, for convenience, as scanning the URL or scanning the URL payload, such scanning may involve, in various embodiments, determining the string that represents the payload and obtain that payload from the location specified by the URL to perform the scanning. The feedback module may be configured to extract the scanning results from the anti-virus engine and to send the scanning results to a rating database. The query module may be configured to query a rating database to determine the status of a payload, thereby minimizing unnecessary scanning.

In an embodiment, the rating database arrangement may include a receive module and a rating database. The receive module is configured at least for receiving the scanning results from the feedback module. The rating database is configured at least for storing the scanning results.

To illustrate how these components may interact with one another to minimize utilization of bandwidth and processing power, consider the situation wherein, for example, a user's request to access a URL is intercepted by a gateway. Upon receiving the user's access request, the gateway may activate a query module to perform pre-scanning analysis. As can be appreciated from the foregoing, the query module may be implemented as part of the anti-virus engine or may be an independent module.

In an embodiment of the invention, the query module may include a local database for storing payload flags, each of which may indicate if the associated payload has been scanned by an anti-virus engine. In an embodiment, the payload flag may be set for a URL that has been designated as a safe website. As can be appreciated from the foregoing, the query module and/or local payload flag database may be located within at least one of an Internet service provide (ISP) server, a gateway host and/or a user's computer system. With the payload flag data readily available locally, needless access to the remote rating database and/or scanning of a payload may be substantially eliminated. Thus, the user's access request for a particular URL may be responded in a more timely manner and needless scanning may be prevented.

If the local payload flag data is not available for a payload, the query module may perform pre-scanning analysis by querying a remote (e.g., web-based or internet-based) rating database. If a payload associated with the requested URL is identified as a payload on the rating database with a verifiable malicious status, the gateway may refuse to grant the user's computer access to the URL. However, if the payload is not a verifiable malicious payload within the rating database, the gateway may begin its own scanning process. As can be appreciated from the foregoing, the rating database may be updated by several sources. Thus, the rating database may include already verified payloads as well as a list of potential malicious payloads that have yet to be verified.

If the pre-scanning process does not identify the payload as a malicious payload, the gateway may activate the anti-virus engine to begin scanning the URL and, optionally, the payload (after the payload is determined from the URL and/or obtained from the location specified by the URL. If the scanning result does not identify the URL and/or the payload as having potential malware, the URL may be identified as safe and the gateway may allow the user's computer to access the URL. However, if the scanning result identifies the URL and/or the payload as having potential malware, the user's computer may be denied access to the URL.

In the prior art, the gateway may perform no additional steps once a decision about user's access request has been determined. In contrast to the prior art, instead of discarding or temporarily saving the scanning results locally, the gateway may activate a feedback module, which may obtain the scanning results and forward the scanning results to the rating database arrangement. In an embodiment, the feedback module may be configured at least for forwarding scanning results that may indicate potential malicious code. As can be appreciated from the foregoing, the feedback module may be implemented as a component within the anti-virus engine or as an independent component.

In an embodiment, a receive module of the rating database arrangement may be configured to receive the scanning results from the feedback modules of different gateways associated with different users. In an embodiment, the receive module may include logic for comparing the potentially malicious payload information against a list of known malicious payloads. The list of known malicious payloads may be a database of malicious payloads. In an embodiment, the database of malicious payloads may be cached within the receive module. If an exact match is identified, the rating database may be updated with the payload, which is now marked with a malicious status. However, if an exact match is not identified, the potential malware is considered to be suspicious and further analysis may be performed.

As can be appreciated from the forgoing, the configuration of the rating database arrangement may depend upon implementation preference. In an example, if a server has sufficient processing power and memory, the receive module and the rating database may both reside within the same server, in an embodiment. However, it is possible to separate the receive module and the rating database into different servers.

In an embodiment, the community scan arrangement may alternatively or additionally include a malware analysis module for analyzing suspicious payloads. The malware analysis module may be employed to determine if the payload is malicious or safe. If the payload is determined to be safe, the rating server database is not updated. In an embodiment, the anti-virus engine may be updated with the rule associated with the suspicious malware, thereby enabling the anti-virus engine to apply the new rule toward analyzing future URLs. On the other hand, if the payload is determined to be malicious by the malware analysis module, the payload malicious status is updated on the rating database, in an embodiment.

The features and advantages of the invention may be better understood with reference to the figures and discussions that follow.

FIG. 1 shows, in accordance with an embodiment of the present invention, a community scan arrangement 100. Consider the situation wherein, for example, a user at a computer 104 sends a request 106 to access a URL, such as www.xyzwidget.com/abc/jill.exe.

As discussed, there are millions or even billions of Internet users. Over the course of time, a user may access a set of number of websites, some of which may be repeatedly accessed. In addition, many of the websites that may be accessed by one user may also be accessed by a set of other users. As a result, cost saving may be had for sharing scanning results for previously visited web sites.

Once the user at computer 104 initiates request 106, request 106 is first intercepted by a gateway host 108. Gateway host 108 may employ an anti-virus detection arrangement 110 to perform malware discovery. In an embodiment, the anti-virus detection arrangement 110 may include an anti-virus engine 112, a query module 116, and a feedback module 114. As can be appreciated from the foregoing, the anti-virus detection arrangement 110 may be implemented in at least one of a user's computer system, a gateway host, and an Internet Service Provider (ISP).

Upon receiving request 106, gateway host 108 may activate query module 116 to perform pre-scanning analysis. Query module 116 may be configured to query a rating database 124 to determine the status of a payload, thereby minimizing unnecessary scanning.

In an embodiment, query module 116 may include a local database for storing payload flag data, which may indicate if a payload has already been scanned by an anti-virus engine. In an embodiment, a payload flag may be set as "safe" for a visited URL if the URL is deemed to be safe. With payload flag data available locally, needless access to the remote rating database or needless scanning of a payload may be substantially eliminated, thereby enabling user's access request to be handled in a more timely manner. If the payload flag is not set, query module 116 may query rating database 124 for a payload status. If the payload has a verifiable malicious status, computer 104 is denied access to the URL. In an embodiment, a warning may be sent to computer 104. In an example, the warning may include the reason for the denial. However, if the payload is not a verifiable malicious payload stored on the rating database 124, anti-virus engine 112 may be activated.

Anti-virus engine 112 may be configured to scan URLs with potential malicious code (e.g., URLs with payloads). As discussed, part of the scanning may involve, in embodiments of the invention, extracting the payload from the location specified by the URL. Examples of anti-virus engines may include, but are not limited to InterScan Web Security Appliance (IWSA), InterScan Gateway Security Appliance (IGSA), Trend Micro Internet Security (TIS), and Corporate Edition (OSCE) etc, all of which are available from Trendmicro. Inc. of Cupertino, Calif. If the scanning result does not identify potential malware associated with the URL, the URL may be identified as safe, and the gateway host 108 may allow the user's computer access to the URL. In other words, computer 104 may be permitted to connect to the Internet to download the payload using the URL. However, if anti-virus engine 112 determines the URL and/or the payload to be potentially malicious, gateway host 108 may deny computer 104 access to the URL. Also, gateway host 108 may send a warning message to computer 104 alerting the user of the potential malicious nature of the payload.

In the prior art, gateway host 108 may perform no additional steps once a decision about a user's access request has been determined. In other words, the scanning results may be discarded after a decision about a user's access request has been determined. In contrast to the prior art, instead of discarding or temporarily caching the scanning results locally, gateway host 108 may activate feedback module 114, which may be configured to extract the scanning results from anti-virus engine 112 and send the scanning results to remote rating database arrangement 122. In an embodiment, the feedback module 114 may be configured at least for forwarding scanning results that may indicate potential malicious code. In an embodiment, the scanning result that may be sent to receive module 118 may include the scanning result and the URL.

In an embodiment, rating database arrangement 122 may include a receive module 118 and rating database 124. Receive module 122 is configured at least for receiving the scanning results sent by feedback module 114. Rating database 124 is configured at least for storing the malicious scanning results generated by anti-virus engine 112, in an embodiment. As can be appreciated from the foregoing, each or both of receive module 118 and rating database 124 may be implemented within a single server or may be on different servers. The implementation may be based on a server capability. In addition, the implementation may depend upon a user's preference.

In an embodiment, receive module 118 may include logic for comparing the potentially malicious payload information against a list of known malicious payloads 120. In other words, receive module 118 is configured to perform comparison and/or evaluation on the scanning result that indicates that a payload is potentially malicious. Comparison may be performed by comparing the potentially malicious payload (the identification and scanning result for which is forwarded by a feedback module of a gateway) against a set of known malicious payloads. This comparison and evaluation validate or verify whether a payload that is identified as potentially malicious by a gateway (and forwarded by the gateway's feedback module to the rating server's receive module) is indeed malicious based on a comparison against a list of known malicious payloads. As discussed, the database of malicious payloads may be cached within the server hosting the receive module or may be cached on a different server.

If an exact match is identified, the rating database may be updated with the payload forwarded by feedback module 114, which payload is now marked with a malicious status. In an embodiment, if list of known malicious payloads 120 is stored on both receive module 118 and rating database 124, a copy of the malicious payload may be made before forwarding the data to rating database 124. By providing an automatic arrangement and methods for updating rating database 124, the rating database may be quickly updated with verified scanning results. Also, with an updated rating database 124, the scanning result may be shared among a plurality of Internet users. Thus, needless scanning may be substantially eliminated, thereby enabling more bandwidth and more processing power to be available on individual gateways.

However, if an exact match is not identified, the potential malware is considered to be suspicious and further analysis may be performed. In an example, the payload may be recorded on a suspicious list 126 and may require additional analysis. In an embodiment, community scan arrangement 100 may include a malware analysis module 128 for analyzing suspicious payloads. Malware analysis module 128 may be employed to determine if the payload is malicious or safe. If the payload is determined to be safe, rating server database 124 is not updated or the payload may be updated with a "safe" status. Additionally or alternatively, anti-virus engine 112 may be updated with the rules associated with the now safe payload, thereby enabling the anti-virus engine 112 to apply the new rule toward analyzing future URLs. In other words, the next time the same payload is encountered, the anti-virus engine 112 is able to identify the payload as being safe. However, if the payload is considered to be malicious by malware analysis module 128, the payload data is updated on rating database 124 with a malicious status, in an embodiment.

Figure 2:
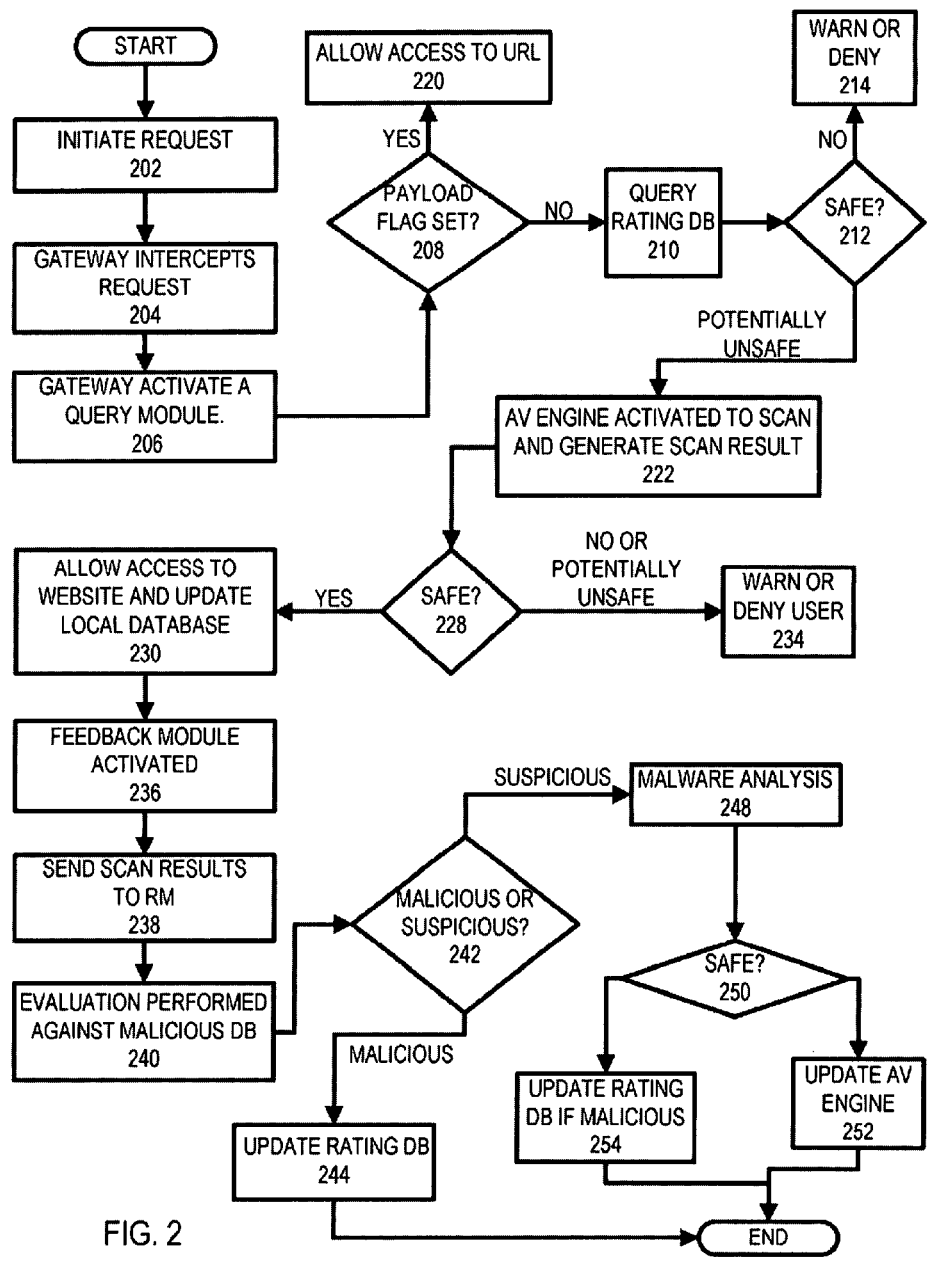
FIG. 2 shows, in an embodiment, a simple flow chart for automatically updating a rating database.

FIG. 2 shows, in an embodiment, a simplified flow chart for automatically updating a rating database.

At a first step 202, a user initiates an access request to a URL. In an example, the user may want to visit www.xyzwidget.com/nbc/story.exe. In this case, the file story.exe is the payload, and the location of the payload is specified by the URL www.xyzwidget.com/nbc/story.exe.

At a next step 204, a gateway host may intercept the access request in order to determine if the payload is safe or unsafe.

In an example, the gateway host may intercept the user's access request to visit the URL, www.xyzwidget.com/nbc/story.exe.

At a next step 206, upon intercepting the URL, the gateway host may activate a query module to perform the pre-scanning analysis of the payload. For example, pre-scanning may include determining whether the payload has already been scanned before, which obviates the need for unnecessary rescanning. In an embodiment, the query module may include a local database of URLs that have been previously visited and are considered safe. In an embodiment, a payload flag may be associated with each URL.

At a next step 208, the gateway host may determine the status of the URL. In an example, from the pre-scanning, the gateway host may determine whether the payload has already been scanned before and/or identified as safe. For example, the payload URL, www.xyzwidget.com/nbc/story.exe, may have a payload flag set as safe. Thus, the gateway host may determine based on the payload flag that the payload is safe and that additional scanning and/or access to the remote rating database is not needed. On the other hand, if the payload flag has not been set as safe, further investigation may be required to determine if the payload URL is unsafe.

At a next step 220, if the payload flag is set as safe in the local payload status database, the gateway host may allow the user's browser to access the URL and download the payload. In other words, the user's browser may be permitted to connect to the Internet to download the payload, story.exe, from the URL, www.news.com/nbc/story.exe.

On the other hand, if the payload flag has not been set as safe, the query module may query a remote rating database for a payload status, at a next step 210. For example, the query module may query the rating database to determine if the payload is listed in the rating database as a verifiable malware. Again, by querying before scanning, unnecessary scanning may be minimized.

At a next step 212, the gateway host may determine if the payload is listed in a rating database with a verifiable malware status.

If the payload URL is identified as malicious, at a next step 214, the gateway host may deny the user's computer access to the URL and/or send a warning (e.g., denial message) to the user's computer. For example, if the payload URL, www.xyzwidget.com/nbc/story.exe, has a payload status of malicious, the gateway host may prevent the user's computer from downloading the payload, story.exe, from the URL www.xyzwidget.com/nbc/story.exe. Alternatively or additionally, the gateway host may send a warning message (e.g., denial message) informing the user the reason for the denial. For example, the warning message may indicate that the payload URL, www.xyzwidget.com/nbc/story.exe, may contain a malicious payload, for example, story.exe. As can be appreciated from the foregoing, the gateway host is able to take advantage of the shared data that may be stored in the rating database to minimize unnecessary scanning.

However, if the payload is not a verifiable malicious payload stored on the rating database, the gateway host may activate the anti-virus engine to begin scanning the URL and/or the payload, at a next step 222. Once the anti-virus engine has been activated, the gateway host may download the URL payload for scanning from the location specified by the URL, for example. During the scanning process, the anti-virus engine may generate scanning results pertaining to the payload (e.g., story.exe).

At a next step 228, the scanning result may indicate that the payload (story.exe), is safe or the scanning result may indicate that the payload, story.exe, is potentially malicious.

If the scanning result identifies no potential malware, at a next step 230, the gateway host may allow the user's computer to access the payload URL and download the payload. In other words, if the scanning result identifies the payload, story.exe, to not include potential malware, the gateway host may allow the user's computer access to the URL, www.xyzwidget.com/nbc/story.exe, and download the payload (story.exe). Also, the local database stored in the query module may be updated to include a payload flag status for the payload URL, for example, www.xyzwidget.com/nbc/story.exe.

At a next step 234, if the scanning result identifies the payload to be a potential malware, the gateway host may deny the user's computer access to the payload URL and/or send a warning message to the user's computer. For example, if the payload URL, www.xyzwidget.com/nbc/story.exe, has a scanning result identifying the payload to be a potential malware, the gateway host may deny the user's computer from downloading the payload, story.exe, from the URL, www.xyzwidget.com/nbc/story.exe. Furthermore, the gateway host may send a warning message, such as a denial message, to the user's computer informing the user the reason for the denial.

At a next step 236, the gateway host may activate a feedback module, which may be configured to extract the potentially malicious scanning results from the anti-virus engine. For example, if the scanning result for the payload URL, www.xyzwidget.com/nbc/story.exe, indicates that the payload may be a potential malware, the feedback module may extract the scanning result for the payload URL, www.xyzwidget.com/nbc/story.exe. As can be appreciated by those skilled in the art, the exact format of the scanning result may vary depending on which scanning engine/version is employed.

At a next step 238, the feedback module may forward the potentially malicious scanning result to a receive module associated with the remote rating database. In an example, the feedback module may forward the scanning result for the payload URL, www.xyzwidget.com/nbc/story.exe, to the receive module for further evaluation.

At a next step 240, once the receive module receives the scanning result, the receive module may compare and/or evaluate the potentially malicious payload information against a list of known malicious payloads. For example, once the receive module receives the scanning result for the payload URL, www.xyzwidget.com/nbc/story.exe, the receive module may compare and/or evaluate the malicious payload information for the payload URL, www.xyzwidget.com/nbc/story.exe, against a list of known malicious payloads to validate or verify if the forwarded payload, story.exe, is indeed malicious or is suspicious and thus merits further investigation.

At a next step 242, the receive module may determine if the payload is malicious or suspicious based on the comparison in step 240.

If the payload is determined to be malicious, at a next step 244, the rating database may be updated with the payload, which is now marked with a malicious status. For example, if the payload URL, www.xyzwidget.com/nbc/story.exe, matches an entry stored on the list of known malicious payloads, the rating database may be updated with the payload URL, www.xyzwidget.com/nbc/story.exe, which is now marked with malicious status.

However, if the payload cannot be confirmed to be a known malicious payload (or confirmed to be a known safe payload), that payload is deemed suspicious. At a next step 248, further analysis may be performed on the payload by employing a malware analysis module to determine if the suspicious payload is indeed malicious or safe.

At a next step 250, a determination is made on the status of the payload by employing the malware analysis engine.

If the payload is determined to be safe, then at a next step 252, the rating database is not updated with a "malicious" status for the URL. Instead, the anti-virus engine may be updated with the rules associated with the payload that is deemed safe. For example, once the analysis module performs analysis on the payload URL, www.xyzwidget.com/nbc/story.exe, and determines the payload to be safe, the anti-virus engine may be updated with the rules associated with the now safe payload URL, www.xyzwidget.com/nbc/story.exe, thereby enabling the anti-virus engine to apply the new rules toward analyzing future access requests for URL, www.xyzwidget.com/nbc/story.exe.

On the other hand, at a next step 254, if the payload is considered to be malicious by the malware analysis module, the payload data is updated on the rating database with a malicious status. For example, if the payload URL, www.xyzwidget.com/nbc/story.exe, is considered to be malicious, the rating database is updated to include the malicious payload data.

As can be appreciated from the forgoing, one or more embodiments of the present invention provide a community scan arrangement for efficiently and automatically updating a rating database. With the present invention, the scanning results can now be shared across multiple Internet users, thereby vastly reducing or minimizing the need for unnecessary rescanning. Thus, bandwidth and processing power previously utilized to perform rescanning may now be available to improve response time and provide a better user's experience.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An apparatus for updating a rating database arrangement, said rating database arrangement being implemented in at least one server device, said apparatus comprising:

a programmed computing device remote from said at least one server device, said programmed computing device being configured to intercept at least an access request associated with at least a Uniform Resource Locator (URL);

an anti-virus engine implemented in said programmed computing device, said anti-virus engine being configured at least for scanning a payload associated with said URL to generate a scanning result, said scanning result including a safe scanning result, said safe scanning result indicating that said payload includes no malicious code known to said anti-virus engine;

a feedback module implemented in said programmed computing device, said feedback module being configured at least for extracting said safe scanning result generated by said anti-virus engine and sending said safe scanning result to said rating database arrangement, said feedback module being further configured for extracting an other-than-safe scanning result generated by said anti-virus engine from scanning a second payload, said feedback module being further configured for sending said other-than-safe scanning result to said rating database arrangement, said second payload being associated with a second URL, said other-than-safe scanning result indicating potential existence of malicious code associated with said second payload;

a list of known malicious code;

a suspicious list, said suspicious list being different from said list of known malicious code;

a receive module configured at least for receiving said other-than-safe scanning result from said feedback module, said list of known malicious code being at least one of a rating database and a list in said receive module, said receive module including logic for comparing said other-than-safe scanning result against said list of known malicious code to determine whether any exact match exists between said other-than-safe scanning result and said list of known malicious code, wherein if an exact match between said second payload and at least a known malicious payload in said list of known malicious code is identified according to said comparing, then said rating database arrangement is updated to include said second URL, and wherein if no exact match between said second payload and any known malicious payload in said list of known malicious code is identified according to said comparing, then said second URL is recorded on said suspicious list; and circuits implemented in said computing device for performing tasks associated with said anti-virus engine and said feedback module.

2. The apparatus of claim 1 wherein said feedback module is integrated with said anti-virus engine.

3. The apparatus of claim 1 wherein said feedback module is configured to be implemented as a component independent of said anti-virus engine.

4. The apparatus of claim 1 wherein said rating database is configured at least for storing said other-than-safe scanning result.

5. The apparatus of claim 1 wherein
if said second payload matches at least one known malicious payload in said list of known malicious code, then a webpage associated with said second URL is deemed malicious, and
if said second payload matches no known malicious payload in said list of known malicious code, then said webpage is deemed suspicious.

6. The apparatus of claim 1 wherein said receive module is configured be executed by a first server.

7. The apparatus of claim 6 wherein said rating database is configured to be executed by a second server different from said first server.

8. The apparatus of claim 1 further comprising a malware analysis module, said malware analysis module configured at least for
obtaining said URL from said suspicious list,
determining whether said a webpage associated with said URL is safe or malicious,
updating said rating database arrangement if said webpage is malicious, and
updating an anti-virus engine rule if said webpage is safe.

9. The apparatus of claim 1 further comprising a local database implemented in said programmed computing device, said local database being configured to cache a plurality of payload flags, each payload flag of said plurality of payload flags being associated with a scanned safe payload that is previously scanned by said anti-virus engine and determined to be safe, said each payload flag of said plurality of payload flags being set for a safe website.

10. The apparatus of claim 1 further comprising a query module implemented in said programmed computing device for querying said rating database arrangement regarding whether a website associated with said URL is malicious before said anti-virus engine scans said payload.

11. A method for updating a rating database arrangement with a plurality of scanning results, wherein each scanning result of said plurality of scanning results is associated with a Uniform Resource Locator (URL) associated with a user's access request, said rating database arrangement being implemented in at least one server device, said method comprising:
intercepting, using a first programmed computing device remote from said at least one server device, a first access request associated with a first URL;
scanning a first payload, using an anti-virus engine implemented in said first programmed computing device, to generate a first scanning result, said first payload being associated with said first URL, said first scanning result being a safe scanning result, said safe scanning result indicating that said first payload includes no malicious code known to said anti-virus engine; and
sending, using said first programmed computing device, said safe scanning result to said rating database arrangement;
using an anti-virus engine implemented in a second programmed computing device to scan a second payload to generate a second scanning result, said second payload being associated with a second URL, said second scanning result being an other-than-safe scanning result, said other-than-safe scanning result indicating potential existence of malicious code associated with said second payload;
sending, using a feedback module implemented in said second programmed computing device, said other-than-safe scanning result to said rating database arrangement;
receiving, using a receive module implemented in said rating database arrangement, said other-than-safe scanning result from said feedback module implemented in said second programmed computing device;
comparing said other-than-safe scanning result against a list of known malicious code, said list of known malicious code being one of a rating database and a list in said receive module;
if an exact match between said second payload and at least a known malicious payload in said list of known malicious code is identified according to said comparing, then updating said rating database arrangement with scanning results associated with said second URL; and
if no exact match between said second payload and any known malicious payload in said list of known malicious code is identified according to said comparing, then adding said second URL to a suspicious list, said suspicious list being different from said list of known malicious code.

12. The method of claim 11 wherein said feedback module is integrated with said anti-virus engine.

13. The method of claim 11 wherein said feedback module is implemented in said first programmed computing device, and said feedback module is configured to be implemented as a component independent of said anti-virus engine.

14. The method of claim 11 further comprising:
storing, using said rating database arrangement, said other than safe scanning result in said rating database.

15. The method of claim 11 further comprising:
If said second payload matches at least one known malicious payload in said list of known malicious code, then deeming a webpage associated with said second URL malicious; and
if said second payload matches no known malicious payload in said list of known malicious code, then deeming said webpage suspicious.

16. The method of claim 11 wherein said receive module is configured to be executed by a first server.

17. The method of claim 16 wherein said rating database is configured to be managed by a second server different from said first server.

18. The method of claim 14 further comprising analyzing said webpage associated with said second URL to determine if said webpage associated with said second URL is safe or malicious;
if said webpage associated with said second URL is malicious, updating said rating database; and
if said webpage associated with said second URL is safe, updating an anti-virus engine rule.

19. The method of claim 11 further comprising:
caching a plurality of payload flags in a local database implemented in said first programmed computing device, each payload flag of said plurality of payload flags being associated with a scanned safe payload that is previously scanned by said anti-virus engine and determined to be safe; and
setting each payload flag of said plurality of payload flags for a safe website.

20. The method of claim 11 further comprising querying, using a query module implemented in said first programmed computing device, said rating database arrangement regarding whether a website associated with said first URL is malicious before using said anti-virus engine to scan said first payload.

* * * * *